United States Patent [19]
Terzuoli

[11] 3,827,396
[45] Aug. 6, 1974

[54] APPARATUS FOR PRODUCING PAPER BAGS
[76] Inventor: Dominick Terzuoli, 2258 E. 70 St., Brooklyn, N.Y. 11234
[22] Filed: Dec. 18, 1972
[21] Appl. No.: 316,368

Related U.S. Application Data
[62] Division of Ser. No. 122,321, March 9, 1971, Pat. No. 3,716,181.

[52] U.S. Cl.................. 118/44, 117/44, 118/423, 156/203, 156/245, 156/466, 156/500
[51] Int. Cl............................................ B05c 11/00
[58] Field of Search.......... 117/43, 44; 118/423, 44; 156/500, 203, 245, 466

[56] References Cited
UNITED STATES PATENTS
2,924,196    2/1960    Henriksen.......................... 118/423

Primary Examiner—William A. Powell
Assistant Examiner—Brian J. Leitten
Attorney, Agent, or Firm—Alvin Sinderbrand

[57] ABSTRACT

Paper bags are produced by folding a web of paper and adhesively securing together overlapped longitudinal edges of the folded web to form a flat tube having opposed panels connected, at their sides, by pleats which extend along the sides of the tube and which are creased inwardly between the panels, cutting across the tube at locations spaced apart along the latter to divide the tube into sections, and embedding at least one end of each tube section in an enveloping cap of thermoplastic material which extends across the tube section and at least partly closes the respective end. The enveloping cap is formed on an end of each tube section, preferably during the movement of successive tube sections along a conveyor path, by dipping the tube section end in a mass of the thermoplastic material heated to a plastic state and then withdrawing the tube section end from the heated mass, or by inserting the tube section end into the cavity of a mold that moves with the tube sections and into which the thermoplastic material is injected about the tube section end, or by applying the thermoplastic material in heated plastic state to one or more rollers that are traversed by the tube section end as the respective tube section is moved along the conveyor path.

1 Claim, 11 Drawing Figures

APPARATUS FOR PRODUCING PAPER BAGS

This application is a Division of my pending application for U.S. Letters Patent Ser. No. 122,321, filed Mar. 9, 1971 now Pat. No. 3,716,181.

This invention relates generally to bags, such as, for example, disposable dust containers or filter bags for vacuum cleaners, and more particularly is directed to an improved method and apparatus for producing such bags.

Disposable filter bags for vacuum cleaners are generally formed of paper or other fibrous flexible material which is porous. Such bags usually are closed at one or both ends and have opposing panels which are connected at the sides of the bag by pleats or gussets to permit expansion of the bag. Further, an aperture is provided either at an end of the bag or in one of the panels thereof for cooperation with the air inlet opening of the vacuum cleaner casing. Since bags of the described character are intended to be disposable, great emphasis is placed on the low cost production thereof. Low cost production of the bags obviously required economical utilization of the fibrous flexible material forming the bags, high speed operation of any machines that may be employed for the bag production, and minimization of any manual labor.

In the production of bags of the described character, the fibrous flexible material is usually supplied in the form of a continuous web, for example, unwound from a roll thereof, and is moved continuously along a predetermined path. During such movement of the web, adhesive is applied along a longitudinal edge of the web and thereafter the web is folded longitudinally upon itself so as to overlap and secure together the longitudinal edge portions of the web by means of the previously applied adhesive, thereby to form a tube. The folding operations further provide the tube with opposed panels connected, at the sides, by pleat extending longitudinally along the tube. The pleated tube formed in the foregoing manner is transversely cut at locations spaced therealong to provide separate tube sections intended to form respective bags.

In forming a bag from each tube section, it is necessary to close at least one of the ends of the tube section. One existing method of closing an end of the tube section involves applying a stripe of adhesive across an end portion of the tube section which is thereafter folded over, for example, as in U.S. Pat. No. 3,276,192. In order to ensure that both panels of the folded over end portion of the tube section will be adhesively secured, the method of closing a bag end requires that the opposed panels of the pleated tube be cut along offset lines when dividing the tube into tube sections. Although devices exist for effecting such cutting of the pleated tube during its continuous movement in the longitudinal direction, such cutting devices have a limited practical operating speed, as do the devices provided for folding over an end portion of each tube section after adhesive has been applied thereto so that the rate at which the described bags can be produced is accordingly restricted. Further, a closed bag end of the described character is not wholly satisfactory in that the end portions of the pleats in the folded over end portion of the bag are not adhesively secured to each other and thus permit the collected dust to seep therebetween.

In order to provide improved sealing of the bags at the closed ends thereof, it has been proposed to provide one or both of the ends of each pleated tube section with two or more transverse folds that are adhesively secured, for example, as in U.S. Pats. No. 2,779,255 and No. 3,479,802. However, the material required for the fold or folds at one or both ends of the bag may represent as much as one-third of the total material required to produce the bag.

In another form of disposable filter bags for vacuum cleaners for example, as disclosed in U.S. Pat. No. 2,909,238, one or both ends of the pleated tube sections are closed by means of a strip of gummed tape which is folded over the bag end to be closed, whereupon the taped end of the bag is folded over and adhesively retained in folded condition. Although this form of filter bag avoids some of the waste of material required for the double-folded bag ends, there is no overall economy as the application of the gummed tape and the subsequent folding are time consuming operations.

In still another form of dust containers or disposable filter bags for vacuum cleaners, one or both ends of the pleated tube sections are closed by stitching the same transversely thereacross and then further sealing each closed bag end by means of a strip of gummed tape which is folded over and covers the stitching. Although this form of filter bag avoids the waste of material required for the folded bag ends, there is again no overall economy, as the transverse stitching of the bag ends and the application of the gummed tape thereover cannot be conveniently effected while the tube sections continue to move at high speed.

In U.S. Pats. No. 3,333,523 and No. 3,361,334, I have proposed that the waste of the fibrous sheet material resulting from the use of multiple folds for closing the ends of filter bags can be avoided by providing the sheet from which a bag of the described type is formed with a stripe of adhesive extending completely across the face of the sheet which is at the inside of the tube adjacent an end of the latter to adhesively secure together the pleats and panels at the end of the tube and thereby form a closed bag end. However, the tightness and reliability of the seal at the closed bag end depend upon the security of the adhesive attachment of the panels and pleats to each other which requires the exertion of a sealing pressure for a substantial period.

Accordingly, it is an object of this invention to provide an improved method and apparatus for producing a bag having opposed panels connected at the sides by pleats so as to be particularly suited for use as a dust container or filter bag in a vacuum cleaner, which bag has one or both of its ends securely and tightly sealed in a reliable manner.

Another object is to provide for the production of a bag of the described character which permits the most economical utilization of the fibrous flexible material from which the same is formed.

A further object is to provide a method and apparatus by which bags particularly suitable for use as disposable dust containers or filter bags of vacuum cleaners may be produced at a high rate of speed and in a most economical manner.

In accordance with an aspect of this invention, a sheet of flexible fibrous material is folded upon itself and has its longitudinal edges secured together in overlapping relation to form a tube having opposed panels connected, at the sides, by pleats extending along the tube, the tube thus formed is cut transversely, at longitudinally spaced locations therealong, into flattened tube sections, and each of the tube sections has an elongated, self-supporting enveloping cap of thermoplastic material applied over at least one of its ends to seal or at least partly close the end embedded therein.

The enveloping plastic cap may be formed on an end of each flattened tube section by dipping such end in a mass of the thermoplastic material heated to a plastic state, or the plastic cap may be injection molded on the end of the tube section. As a further alternative, the thermoplastic material heated to a plastic state may be applied to the end of a tube section by an applicator roller or rollers defining a recess through which the end of the tube section is moved.

The above, and other objects, features and advantages of this invention, will be apparent in the following detailed description of illustrative embodiments which is to be read in connection with the accompanying drawings, wherein:

Figures 1, 2, 3, 4:
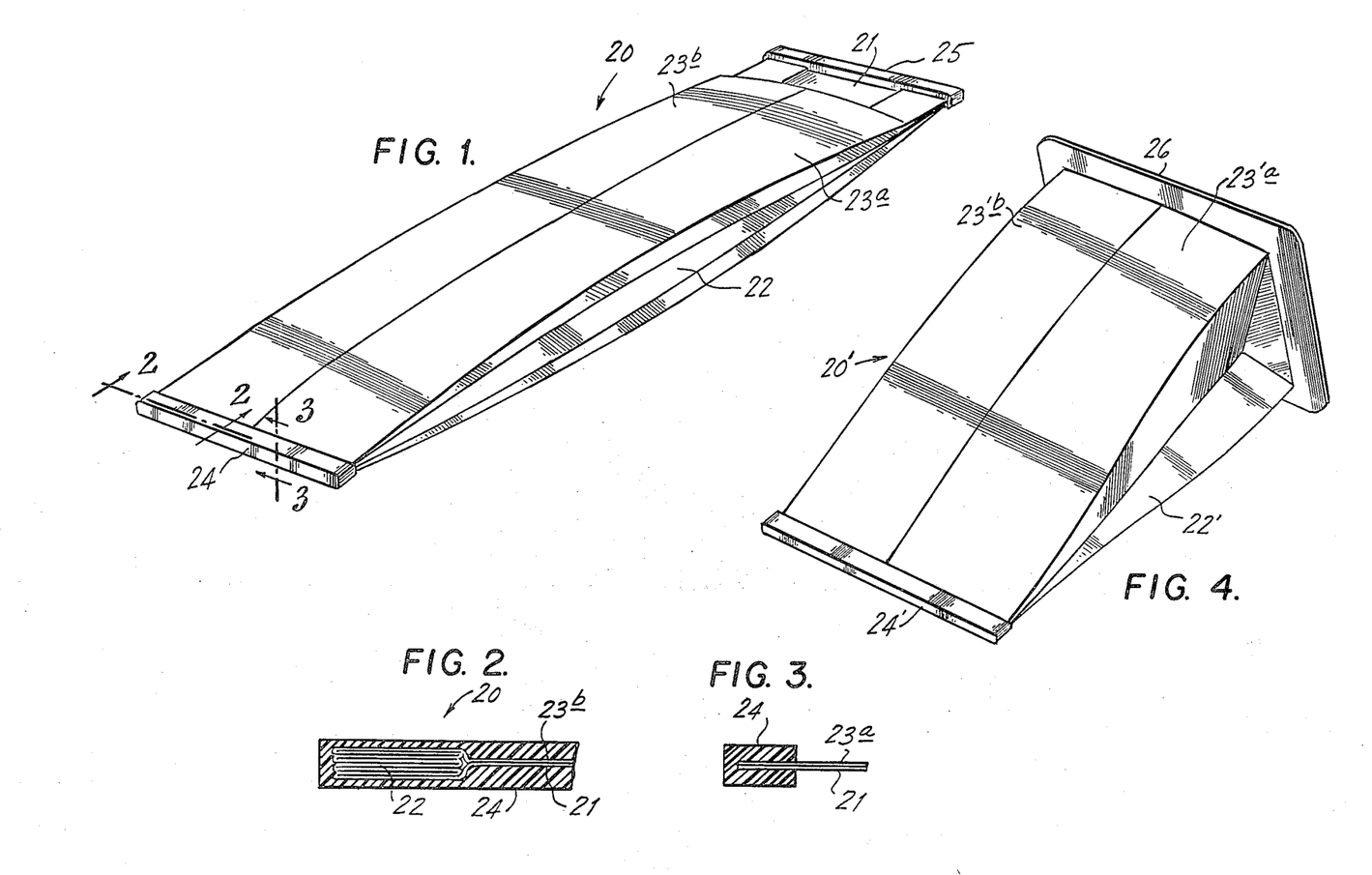
FIG. 1 is a perspective view of one form of bag that may be produced by the method and apparatus embodying this invention.
FIGS. 2 and 3 are enlarged, fragmentary sectional views taken along the lines 2—2 and 3—3, respectively, on FIG. 1.
FIG. 4 is a perspective view of another form of bag that may be produced by the method and apparatus embodying this invention.

Referring to the drawings in detail, and initially to FIG. 1 thereof, it will be seen that a bag 20 that may be produced in accordance with this invention is formed of a sheet of flexible material, such as, paper or other fibrous material which is preferably porous when the bag is to be employed as a disposable dust container or filter bag for vacuum cleaners. The paper sheet for forming the bag 20 is folded about longitudinal fold lines so that its central portion forms a panel 21 connected, at its opposite sides, by pleats 22 with longitudinal edge portions 23a and 23b, respectively. The portions 23a and 23b extend inwardly towards each other so as to overlap at their edges, and such overlapping edges are secured to each other by an adhesive stripe extending therealong. It will be seen that the folded sheet having its longitudinal edges adhesively secured to each other forms a flattened tube having opposed panels 21 and 23a, 23b connected, at the sides of the tube, by pleats 22 extending along the tube. A bag may be formed from the flattened tube merely by closing or sealing at least one end thereof.

In accordance with this invention, closing of an end of the flattened tube is effected by embedding the adjacent end edge portions of panels 21 and 23a, 23b and of pleats 22 in an elongated, self-supporting, enveloping cap 24 of thermoplastic material extending across the end of the tube which is to be closed (FIGS. 1, 2 and 3). Since the elongated plastic cap 24 completely envelops the end edge portions of panels 21 and 23a, 23b and of pleats 22, it will be apparent that the cap 24 securely seals the end of bag 20 across which it extends, and thereby prevents seepage of dust from the closed end of bag 20 without resort to multiple folds at the end of the bag. Such multiple folds, as previously employed for closing the ends of dust containers or filter bags, require a sheet of flexible material having a length up to one-third greater than the length of the finished bag, whereas the sheet for forming the bag in accordance with this invention has a length equal to that of the finished bag and therefore effects the most economic utilization of the sheet material. Since the plastic cap 24 is self-supporting and envelops the end edges of the sheet material or paper embedded therein, the reliability of the closure or sealing of the bag end is not dependent upon the adhesive attachment of plies of the fibrous sheet material to each other, as in my previously mentioned U.S. Pat. Nos. 3,333,523 and No. 3,361,334.

The bag shown on FIG. 1 is a disposable dust container or filter bag for vacuum cleaners of the type having one of its ends completely closed or sealed by the plastic cap 24 in the manner described above, while its other end is only partly closed, that is, expansion of the pleats 22 at such other end is prevented, so that the partly closed end of the bag can form an inlet opening closely receiving the vacuum cleaner inlet through which dust laden air is supplied to the bag 20.

In accordance with the present invention, partial closing of bag 20 at the end thereof which is to constitute the inlet opening for receiving dust laden air is effected by an elongated, self-supporting, enveloping cap 25 of thermoplastic material extending across such end of bag 20 and having the adjacent end edges of the panel 21 and the pleats 22 embedded therein and secured to each other by the cap 25, while the adjacent end edge of the other panel 23a, 23b is free of the plastic cap 25. Thus, cap 25 holds the pleats 22 closed at the respective end of the bag and a restricted opening is defined between the adjacent free edge of panel 23a, 23b and panel 21.

Referring now to FIG. 4, it will be seen that the present invention can also be employed for closing or sealing one end of a dust container or filter bag 20' of the type having a rigid cardboard collar 26 adhesively attached to the opposite end of the bag and having an aperture (not shown) defining the inlet opening for the dust laden air. In accordance with this invention, the end of bag 20' remote from the cardboard collar or disk 26 is tightly closed or sealed by an elongated, self-supporting, enveloping cap 24' of thermoplastic material extending across such end of the bag and having the adjacent end edges of the panel 23'a, 23'b, the side pleats 22' and the other panel (not shown) embedded in, and secured to each other by the cap 24'.

Figure 5:
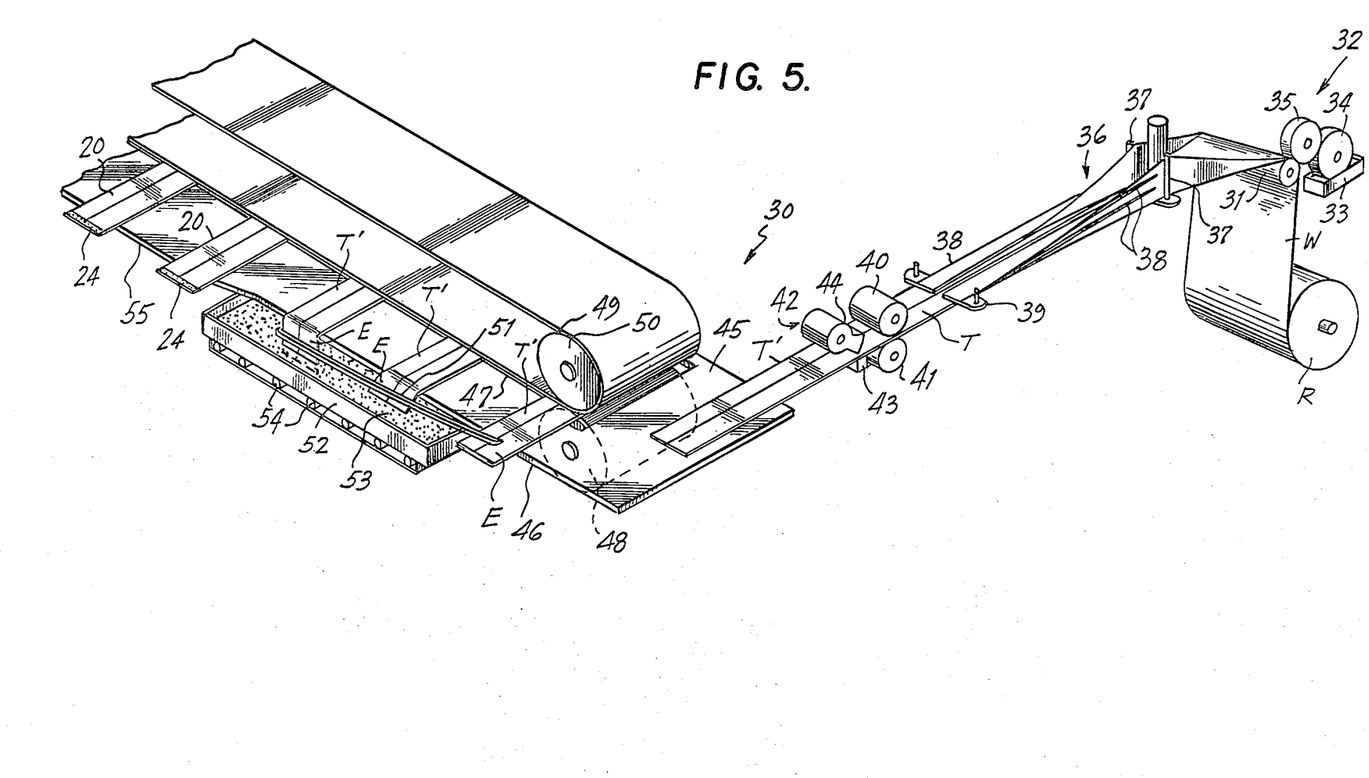
FIG. 5 is a schematic perspective view illustrating apparatus according to this invention for producing a bag, for example, as in the embodiment of FIG. 1.

Referring now to FIG. 5, it will be seen that bags having ends thereof closed in accordance with this invention, as described above, may be produced automatically and at a high rate of production in an apparatus 30 employing, as the starting material, a continuous web W of sheet material which is unwound from a supply roll R. The web W being unwound from roll R moves continuously in the longitudinal direction and travel around a backup roller 31 which is suitably rotated and serves to support the web during the application of a longitudinal stripe of adhesive to the web along one of its longitudinal edges by means of an adjacent adhesive applying device 32. As shown, the device 32 may include a reservoir or tank 33 containing a supply of suitable adhesive, a pickup roller 34 rotatably supported to dip into the supply of adhesive in reservoir 33, and a suitably driven adhesive applying wheel 35 which is rotatably supported to effect peripheral rolling contact with the surface of roller 34, for receiving adhesive from the latter, and with the web W on the backup roller 31.

After the longitudinal stripe of adhesive has been applied to the web, the latter moves continuously through a folding device 36 which may be of conventional type, as shown. Such folding device 36 generally includes upright guide posts 37 which are spaced apart by a distance approximately equal to the width of panel 21 of the finished bag, and which operate to upwardly bend the lateral portions of the web. The device 36 further generally includes inner and outer pleating plates 38 which are suitably supported, as at 39, and which act on the lateral portions of the web bent upwardly by posts 37 to form the pleats 22 and the inwardly directed, overlapping portions 23a and 23b of the tube.

After the web W has been folded by device 36 into a continuous tube T having opposed panels connected, at the sides of the tube, by pleats extending therealong, such tube passes between rollers 40 and 41 which are suitably driven to pull the web through the folding device. The drive rollers 40 and 41 further press the tube flat and thereby achieve secure bonding of the overlapping edges of panel portions 23a and 23b by the adhesive stripe between the overlapping edges. In order to cut the continuous flattened tube T into sections T' from which respective bags are to be formed, apparatus 30 has a cutting device 42 disposed at a location following drive rollers 40 and 41, and which may include a fixed blade or anvil 43 disposed below the path of movement of the tube and a rotary cutter 44 located above the flattened tube and cooperating with the anvil 43 to transversely shear the paper tube. The rotary cutter 44 is suitably driven so as to cut the paper tube when the length of the latter extending beyond the cutting edge of anvil 43 is equal to the length of the bag to be formed.

The successive cut tube sections T' are delivered, either manually or otherwise, to an end of a conveyor table 45 along which they are moved during the closing of an end of each of the tube sections. During such movement, the successive tube sections T' extend transversely with respect to the direction of their movement and each have an end portion E projecting laterally beyond a side edge 46 of the conveyor table. The movement of tube sections T' along table 45 may be effected by a lower conveyor belt 47 running around pulleys 48 and an upper conveyor belt 49 running around pulleys 50. The pulleys 48 and 50 are suitably driven and mounted so that the upper run of belt 47 travels along the upper surface of table 45 in the direction away from the end of table 45 receiving the cut tube sections T', and the lower run of belt 49 bears downwardly on the upper run of belt 47 and travels in the same direction. Thus, the successive tube sections T' are grasped between the confronting runs of belts 47 and 49 and carried over the surface of table 45.

As each tube section T' is transported along the surface of table 45, its projecting end portion E is bent downwardly by a suitably supported guide bar 51 which extends along table edge 46 and is inclined downwardly in the direction of movement of the tube sections. An upwardly open tray or reservoir 52 is mounted below the side edge 46 of table 45 and contains a mass 53 of a suitable thermoplastic material which is maintained in its molten or plastic state by electric heaters 54. The arrangement is such that, as the projecting end E of each of the conveyed tube sections T' is bent downwardly by guide bar 51, the end edge portion of the tube section dips into the molten mass 53 of thermoplastic material in tray 52. As each conveyed tube section T' reaches the end of guide bar 51 and is released by the latter, the downwardly bent end portion E of the tube section tends to return to its horizontal position by reason of the resiliency of the fibrous material of which the tube section is formed, and such return of the end portion E of the tube section to its horizontal position is assisted by a lateral extension 55 of table 45 which projects beyond edge 46 after tray 52. The lateral extension 55 of table 45 will of course tend to lift and support the end portions of the successive tube sections which had been previously bent downwardly by the guide bar 51. By reason of the dipping of the end edge portion of each tube section into the molten mass 53 of thermoplastic material in tray 52, a relatively thick coating or layer of such material adheres to and envelops the end edge portion when removed from the tray 52 and thereby forms the elongated plastic cap 24 for closing an end of each of the bags 20.

In the apparatus described above with reference to FIG. 5, the elongated plastic cap 24 for closing an end of each bag is applied to the respective tube section T' by the described dipping operation which is performed during the continuous movement of the tube section by the conveyor belts 47 and 49. Thus, there is a continuous flow of material through apparatus 30 from the supply roll R of the paper web to the discharge end of conveyor belts 47 and 49 at which bags 20 having one end closed or sealed are discharged from the apparatus.

Although the apparatus 30 described above forms the plastic cap 24 on an end of each bag by a dipping operation, it is apparent that the plastic cap can be formed on each bag in a number of other ways. For example, in the apparatus 130 illustrated on FIGS. 6 and 7, the plastic cap closing or sealing an end of each bag 20 in accordance with this invention is formed by an injection molding operation. More specifically, the apparatus 130 is shown to comprise a table 45 receiving the successive tube sections T' which may be formed in the manner described with reference to FIG. 5, and conveyor belts 47 and 49 extending along table 45 and by which the successive tube sections T' are moved continuously along the table. Each tube section, while conveyed, extends transversely with respect to the direction of movement and is disposed with an end portion of the tube section projecting laterally beyond a side edge 46 of the conveyor table. The apparatus 130 further comprises a molding assembly 56 which is movable along a box-like track 57 extending parallel to side edge 46 of the conveyor table.

Figures 6, 7:
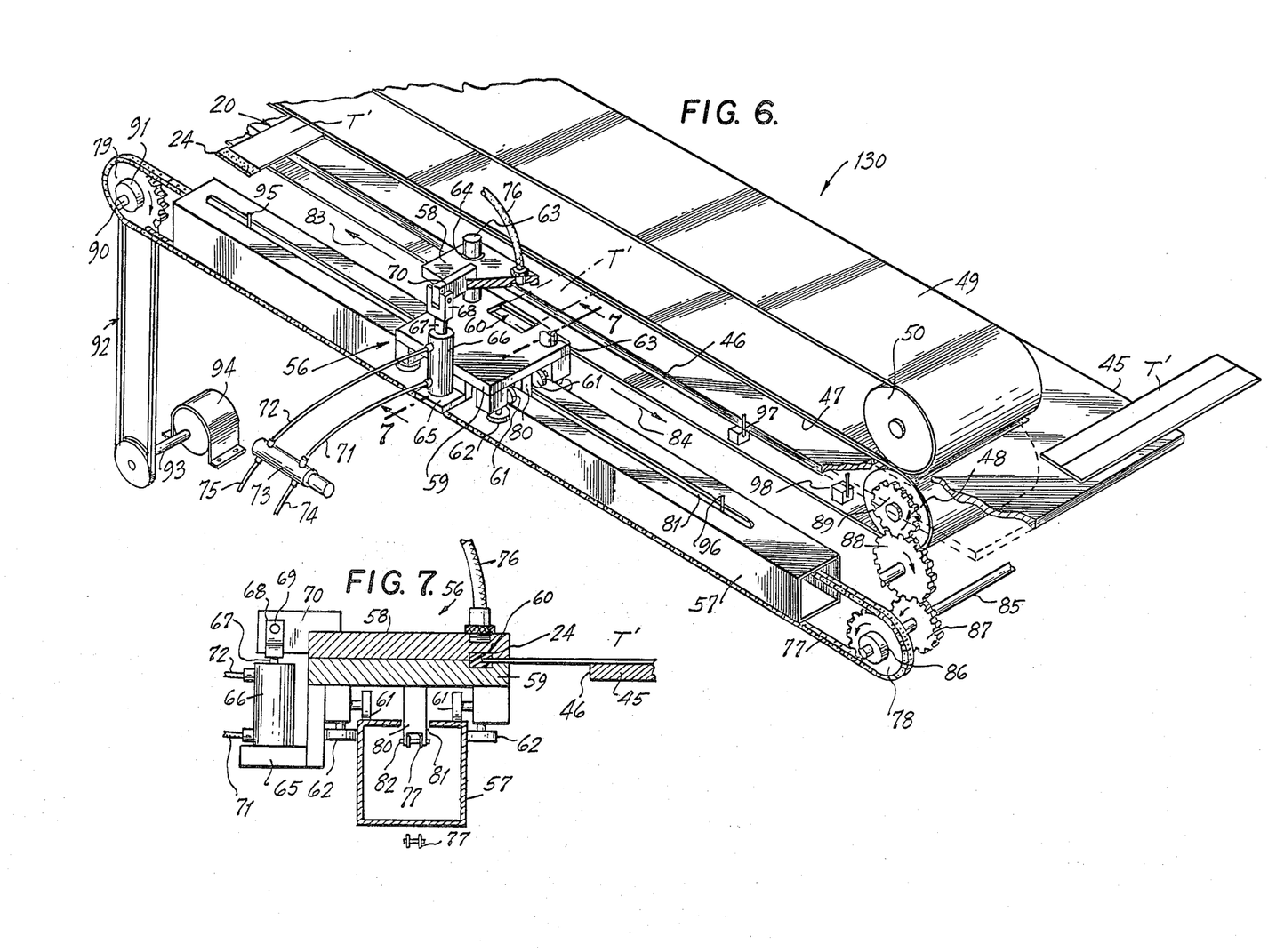
FIG. 6 is a schematic perspective view showing another apparatus according to this invention for closing or sealing an end of a bag.
FIG. 7 is an enlarged sectional view taken along the line 7—7 on FIG. 6.

The assembly 56 is seen to include upper and lower mold parts 58 and 59 which are superposed and have mating recesses in their confronting surfaces to define a mold cavity 60 (FIG. 7). The lower mold part 59 forms a carriage on which there are mounted rollers 61 and 62 in rolling contact with the top surface and the opposed side surfaces of guide track 57 for movement of the assembly 56 along the guide track. Guide posts 63 (FIG. 6) are directed vertically upward from lower mold part 59 and extend slidably through guide bushings 64 provided in upper mold part 58, whereby the latter is movable vertically between a raised position (FIG. 6) in which the cavity 60 is open, and a closed or lowered position (FIG. 7) in which cavity 60 is closed and envelops an end of a tube section T' extending therein. A bracket 65 depends from lower mold part 59 and supports a pneumatically operated cylinder 66 having a piston rod 67 projecting from its upper end and being secured by a clevis 68 and pin 69 (FIG. 7) to a bracket 70 extending from upper mold part 58.

Flexible hoses 71 and 72 extend from a solenoid controlled valve 73 to the lower and upper ends, respectively, of cylinder 66 for alternately supplying and exhausting hydraulic or other fluid under pressure to and from the cylinder. The solenoid controlled valve 73 has a conduit 74 extending thereto from a source (not shown) of the fluid under pressure and a conduit 75 extends from the valve back to such source. Solenoid valve 73 is of a conventional type designed so that, upon energization of the valve, fluid under pressure is supplied to the upper end of cylinder 66 through hose 72 and exhausted from the lower end of the cylinder through hose 71, whereby cylinder 66 moves mold part 58 downwardly to close cavity 60. On the other hand, when solenoid valve 73 is deenergized, fluid under pressure is supplied to the lower end of cylinder 66 through hose 71 and exhausted from the upper end of the cylinder through hose 72, whereby cylinder 66 raises mold part 58 to open the mold cavity.

When cavity 60 is closed with an end edge portion of a tube section T' extending into the mold cavity, as shown particularly on FIG. 7, a thermoplastic material in molten state is supplied to the closed cavity 60 through a flexible feed conduit 76 which extends from a conventional plastic pump (not shown) associated with a source of the plastic material. The feeding of a predetermined quantity of the molten plastic material to cavity 60 is suitably controlled so as to occur only when such cavity is closed. The mold cavity 60 is suitably dimensioned so that it corresponds to the elongated cap 24 which is to be molded in enveloping relation to the end of the tube section T' extending into the mold cavity. During the molding of the cap 24 about the end edge portion of a tube section T', the latter is continuously moved by the conveyor belts 47 and 49 and, therefore, molding assembly 56 is moved with tube section T' during the molding of a plastic cap 24 on the latter.

In order to effect such movement of mold assembly 56, apparatus 130 has a drive chain 77 (FIG. 6) running around sprockets 78 and 79 which are located adjacent the opposite ends of guide track 57 so that the upper run of chain 77 will extend longitudinally through through the guide track. A connecting member 80 depends from lower mold part 90 and extends through a longitudinal slot 81 formed along the top of guide track 57. As shown on FIG. 7, the connecting part 80 is suitably attached, as at 82, to the upper run of chain 77, whereby mold assembly 56 is moved in the direction of movement of the successive tube sections, as indicated by the arrow 83 on FIG. 6, in response to the rotation of sprocket 78 in the counterclockwise direction. Conversely, mold assembly 56 is moved in the return direction, as indicated by the arrow 84, in response to the rotation of sprocket 79 in the clockwise direction.

In order to control the movements of mold assembly 56, sprocket 78 is mounted for rotation on a shaft 85 and is rotatably coupled to the latter only upon energization of en electrically actuated clutch 86. Shaft 85 is rotated through a gear 87 fixed thereon and meshing with an idler gear 88 which, in turn, meshes with a gear 89 rotating with pulley 48. The gears 87, 88 and 89 are dimensioned so that, upon the energizing of electric clutch 86, mold assembly 56 will be driven in the direction of the arrow 83 at the same speed as the conveyed tube section T'.

The other sprocket 79 is freely rotatable on a shaft 90 and is rotatably coupled to the latter only upon energization of an electric clutch 91. The shaft 90 is rotated, for example, through a pulley and belt transmission 92, by a drive shaft 93 rotated, for example, by an electric motor 94. The arrangement is such that, when electric clutch 91 is energized, sprocket 79 is rotated in the clockwise direction for the return movement of mold assembly 56 in the direction of arrow 84 at a high speed.

Limit switches 95 and 96 are suitably mounted at spaced apart locations on guide track 57 and are engageable by mold assembly 56, for example, by the connecting member 80 thereof, so as to limit the movement of the mold assembly in the directions of the arrows 83 and 84, respectively. Additional limit switches 97 and 98 are mounted adjacent the edge 46 of conveyor table 45 at suitably spaced apart locations so as to be engageable by the projecting end portions of tube sections T' conveyed along such table. The several switches 95-98 are included in suitable electric control circuits (not shown) for automatically controlling the several operations by which the apparatus 130 molds an enveloping cap 24 on an end edge portion of each of the tube sections. More specifically, when switch 98 is engaged by a tube section T' delivered to table 45 and commencing its movement along the table by conveyor belts 47 and 49, such engagement of switch 98 is effective to cause the energizing of electric clutch 91 so that mold assembly 56 is rapidly returned in the direction of arrow 84 to a position at which such mold assembly engages switch 96 and thereby deenergizes clutch 91. When the tube section T' is further conveyed and engages switch 97, such engagement of the switch causes energizing of electric clutch 86 and also energizing of solenoid valve 73. The location of switch 97 is selected in relation to the location of switch 96 so that engagement of the switch 97 by a tube section T' will occur when an end edge portion of such tube section extends into the open mold cavity 60 of the mold assembly 56 at its returned position defined by switch 96. Thus, upon engagement of switch 97 by a tube section, mold assembly 56 will be moved with the conveyed tube section extending into its mold cavity 60, and such mold cavity will be closed. Upon the closing of the mold cavity 60, the pump or other source of supply of the molten thermoplastic material can be suitably energized to inject a measured quantity of the thermoplastic material into the closed cavity. When the mold assembly 56 reaches the end of its forward travel in the direction of the arrow 83 and engages switch 95, such engagement of switch 95 is effective to cause de-energizing of electric clutch 86 and also of solenoid valve 73 so that the forward movement of the mold assembly is halted and the mold cavity 60 is opened to permit the removal of the molded cap 24 from the mold cavity and the continued movement of the molded cap with the tube section T' on which it has been molded.

The mold assembly 56 is thereafter returned in the direction of the arrow 84 to its starting position when the tube section next delivered to the table 45 comes into engagement with the switch 98.

Figure 8:
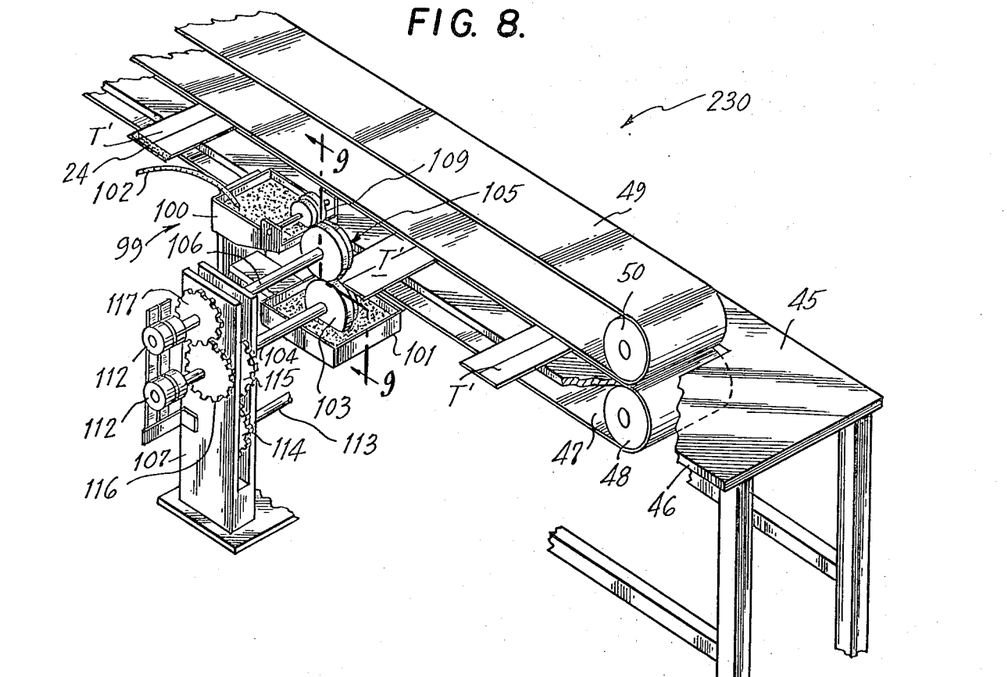
FIG. 8 is a view similar to that of FIG. 6, but showing another apparatus according to this invention.
Figure 9:
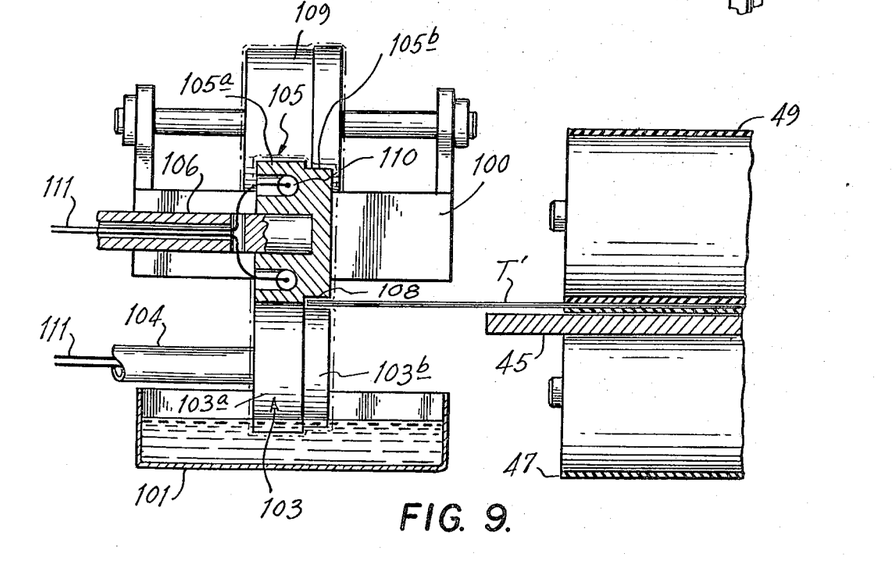
FIG. 9 is an enlarged sectional view taken along the line 9—9 on FIG. 8.

In the apparatus 30 of FIG. 5, each enveloping cap 24 formed on an end of a tube section T' by a dipping operation is unconfined during its formation, whereas, in the apparatus 130 of FIGS. 6 and 7, each enveloping cap 24 is fully confined in the mold cavity 60 during its formation. However, as shown on FIGS. 8 and 9, an apparatus 230 according to this invention may only partly mold or confine the material constituting each cap 24 during the formation thereof on the end of a tube section T'. In the apparatus 230, the successive tube sections T' are again delivered to a conveyor table 45 and conveyed along the latter by belts 47 and 49 with each tube section extending laterally on the table and having an end portion projecting laterally beyond the table edge 46. The apparatus 230 is shown to further comprise a device 99 mounted adjacent the side edge 46 of table 45 and being operative to apply a thermoplastic cap 24 to each of the tube sections as the latter are conveyed past device 99. Such device 99 is shown to include upper and lower reservoirs 100 and 101 containing masses of thermoplastic material and which are preferably provided with electric heaters (not shown) to maintain the thermoplastic material in a molten or plastic state. Further, a supply conduit 102 may extend to upper reservoir 100 from a source of the thermoplastic material for replenishing the supply in the upper reservoir. A lower applicator reel or roller 103 mounted on a horizontal shaft 104 dips into the supply of plastic material in lower reservoir 101 and has a stepped surface providing a large diameter portion 103a and a small diameter portion 103b (FIG. 9). An upper applicator wheel or roller 105 is mounted on a horizontal shaft 106 and also has a stepped surface to provide a large diameter portion 105a and a small diameter portion 105b. Shafts 104 and 106 are suitably journalled in a support frame 107 so that the large diameter portions 103a and 105a of the applicator rollers are in rolling contact with each other, and a recess 108 (FIG. 9) is defined between the small diameter roller portions 103b and 105b and is located for the passage of end edge portions of the successive conveyed tube sections T' through such recess 108. A transfer wheel or roller 109 is rotatably mounted on upper reservoir 100 so as to dip into the supply of plastic material in the latter, and such transfer roller 109 is of stepped configuration to provide small and large diameter portions which respectively engage and transfer plastic material to the large and small diameter portions of applicator roller 105. Preferably, applicator rollers 103 and 105 are each provided with an electrical heating element 110 (FIG. 9) so as to maintain the thermoplastic material in molten or plastic condition on the applicator rollers. The current for energizing the electrical heaters 110 can be supplied thereto by way of conductors 111 extending through the respective shafts 104 and 106 from slip rings 112 (FIG. 8) provided on end portions of such shafts. The applicator rollers 103 and 105 are preferably driven in synchronism with the movement of tube sections T', for example, by a drive shaft 113 connected to the conveyor drive (not shown) and carrying a gear 114 meshing with a gear 115 on shaft 104, and further by meshing gears 116 and 117 on shafts 104 and 106. It will be apparent that, as an end edge portion of each tube section T' moves through recess 108, the molten thermoplastic material supplied to rollers 103 and 105 from reservoirs 100 and 101 and coating the surfaces of such rollers 103 and 105 will be applied to the end edge portion of the tube section with the thickness and extent of the applied thermoplastic material being determined by the recess 108. As each tube section T' moves away from rollers 103 and 105, the thermoplastic material applied by the applicator rollers will set and thereby form the enveloping cap 24 for sealing the end of the tube section.

Figures 10, 11:
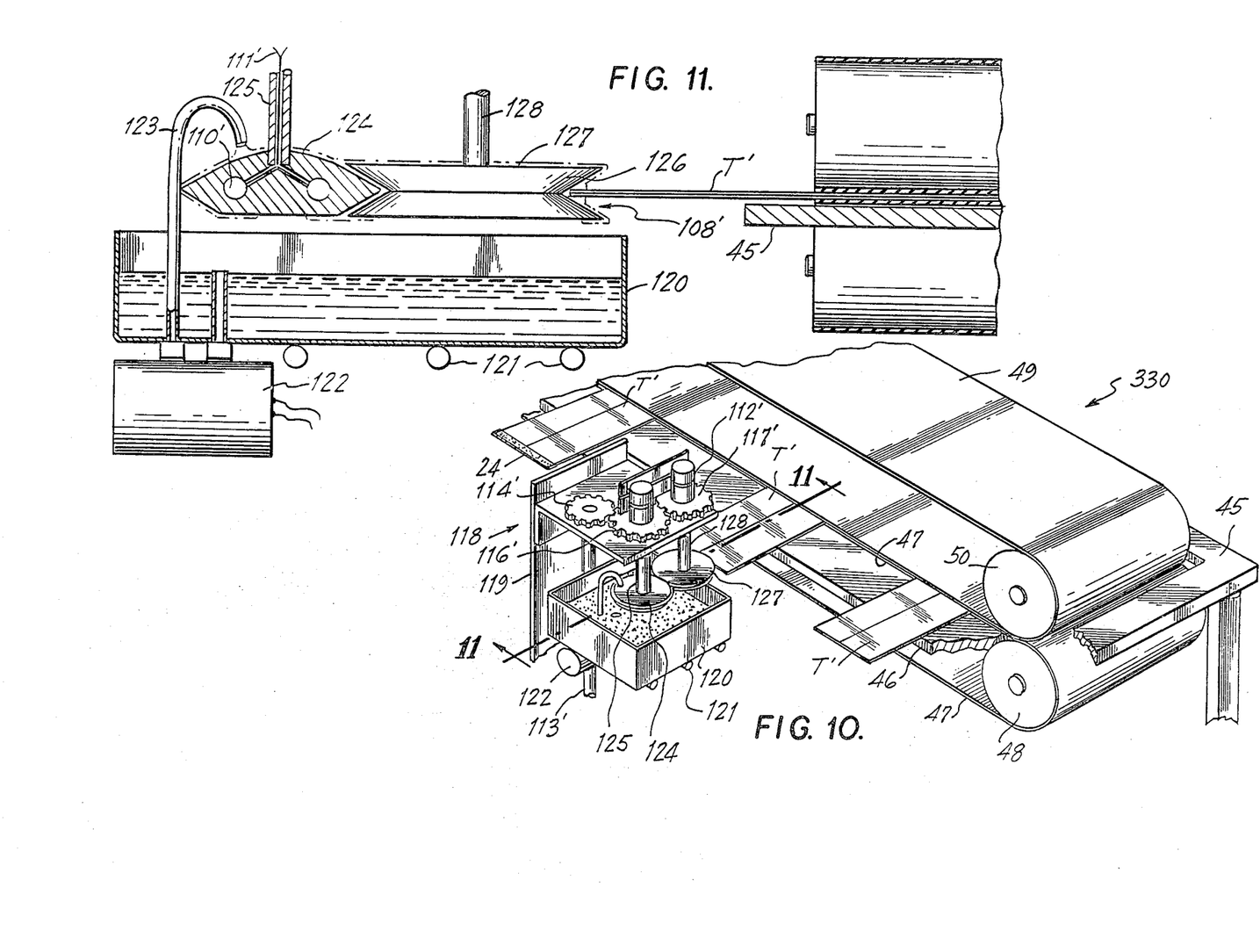
FIG. 10 is another view similar to that of FIG. 6, and showing still another apparatus according to this invention.
FIG. 11 is an enlarged sectional view taken along the line 11—11 on FIG. 10.

Referring now to FIGS. 10 and 11, it will be seen that, in the apparatus 330 according to the invention, as there illustrated, each of the tube sections T', while being conveyed along the table 45 by conveyor belts 47 and 49, has thermoplastic material, in a plastic or molten state, applied to an end edge portion of the tube section by a device 118 that is fixedly mounted adjacent the edge 46 of the conveyor table. The device 118 is shown to include a supporting frame 119 carrying a reservoir 120 which contains a supply of the thermoplastic material maintained in a molten or plastic state by electric heaters 121. A motor driven pump 122 withdraws molten plastic material from reservoir 120 and discharges the same through a spout 123 onto the surface of a transfer wheel 124 which is rotatably carried by a vertical shaft 125 journalled in frame 119. The transfer wheel 124 engages at its periphery in the grooved periphery 126 of an applicator wheel or roller 127 carried by a vertical shaft 128 also journalled in frame 119. It will be seen that the grooved periphery 126 of the applicator wheel defines a recess 108' through which the end edge portions of the successively conveyed tube sections T' travel during movement past the device 118.

As in the embodiment described with reference to FIGS. 8 and 9, the rollers 124 and 127 preferably contain electric heaters 110' which are energized through conductors 111' extending through the respective shafts 125 and 128 from slip rings 112' (FIG. 10) provided on the upper end portions of the shafts. Further, the rollers or wheels 124 and 127 are preferably rotated in synchronization with the movement of the tube sections, for example, by a drive shaft 113' driven from the conveyor drive (not shown) and carrying a gear 114' meshing with a gear 116' on shaft 125 which, in turn, meshes with a gear 117' on shaft 128. It will be apparent that, as wheels 124 and 127 are thus rotated, the molten thermoplastic material delivered to the surface of transfer wheel 124 by pump 122 will coat the surfaces of applicator wheel 127 and the recess 108' defined by the grooved periphery of the applicator wheel will determine the extent to which the thermoplastic material on the surface of the applicator wheel is applied to the edge portion of each tube section T'.

It will be seen that, in each apparatus provided according to this invention, the thermoplastic material is applied only to exterior surfaces and edge portions of each tube section T' while the latter is in its flattened condition. The sealing or partial closing of an end of the tube section is effected by the mass of the thermoplastic material thus applied, rather than by the use of an adhesive or thermoplastic material for causing adherence to each other of fibrous surfaces of the tube section. In all of the embodiments of this invention described above, there is no necessity to maintain a sealing pressure on an end of each tube section T' for a long period of time in order to ensure the adequate adherence of the fibrous surfaces to each other.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention.

What is claimed is:

1. In apparatus for manufacturing bags: the combination of conveyor means for moving flattened paper tube sections in succession along a planar path with each tube section extending transversely with respect to said path and having an end portion projecting laterally to one side of said path; means defining a support surface extending along said one side of said path for supporting at least part of the projecting end portion of each tube section as the latter is moved in said path by said conveyor means, said support surface having a first longitudinal edge portion along an initial portion of said conveyor path, considered in the direction of movement of the tube sections therealong, and which is spaced laterally from said path by a relatively small distance so that said projecting end portion of each tube section extends substantially beyond said first longitudinal edge portion when moving along said initial portion of the conveyor path, said support surface further having a second longitudinal edge portion extending from said first longitudinal edge portion in said direction of movement of the tube sections and being spaced from said path by a relatively larger lateral distance than said first longitudinal edge portion; and means for embedding the projecting end of each tube section in a thermoplastic cap including a reservoir containing a mass of said thermoplastic material and disposed adjacent said first longitudinal edge portion of said support surface, means for heating the material in said reservoir to its plastic state, a guide member extending along said first longitudinal edge portion of the support surface and being inclined toward said reservoir from the plane of said path in said direction of movement of the tube sections for deflecting said projecting end portion of each tube section out of said plane of the conveyor path about said first longitudinal edge portion and causing the respective end of the tube section to dip to a predetermined extent into said material heated to a plastic state in said reservoir as the tube section is moved along said initial portion of the conveyor path, and said second longitudinal edge portion of the support surface being effective to return said projecting end portion of each tube section to said plane of the conveyor path, and thereby positively remove said projecting end portion from said reservoir, as the tube section is moved beyond said initial portion of the conveyor path.

* * * * *